(No Model.) 2 Sheets—Sheet 2.
F. G. SCHUERMAN.
WATER SUPPLY REGULATOR.
No. 478,526. Patented July 5, 1892.
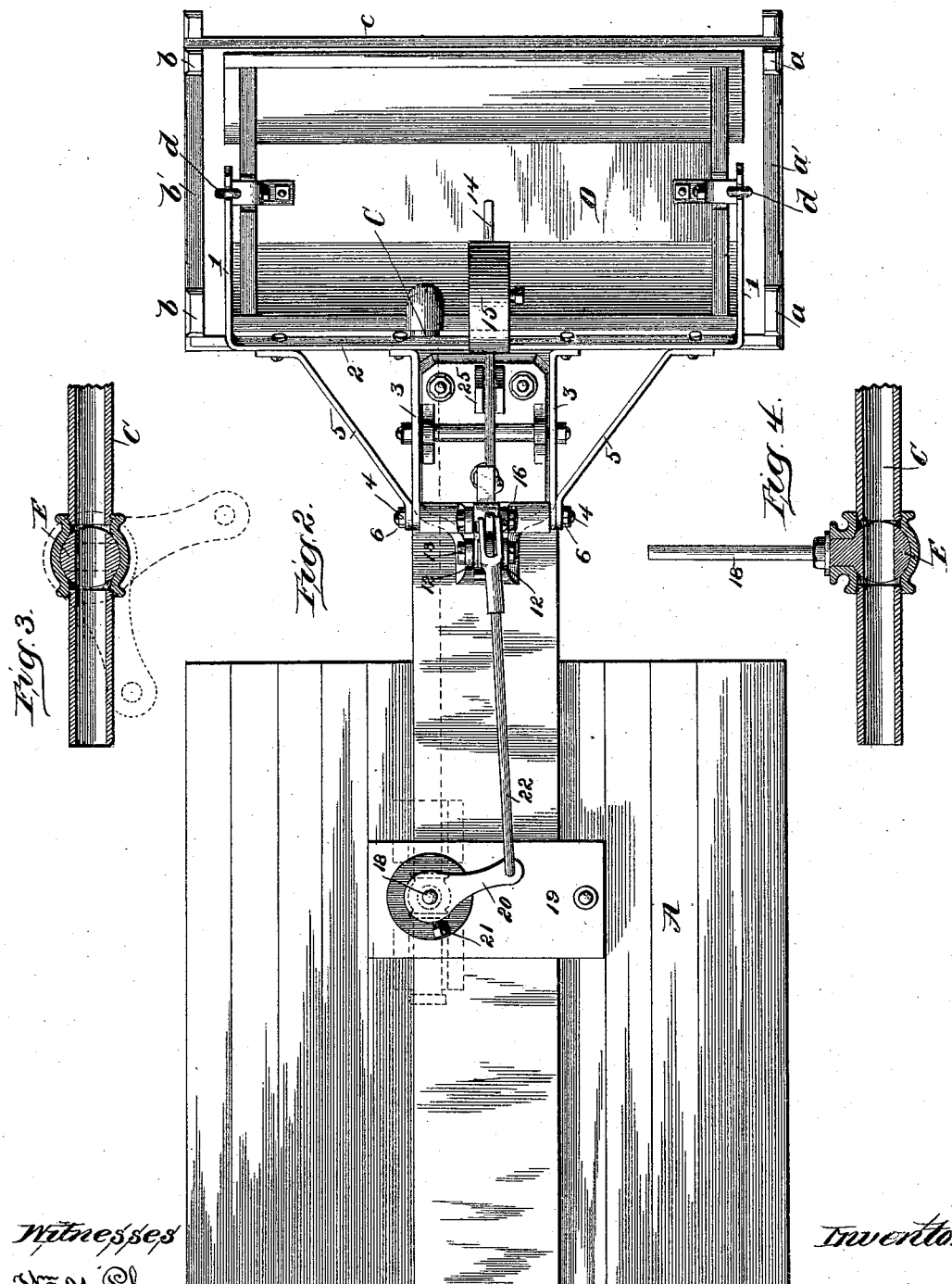
Witnesses
Inventor
Frederick G. Schuerman
By Elliott & Onohundro
Att'ys

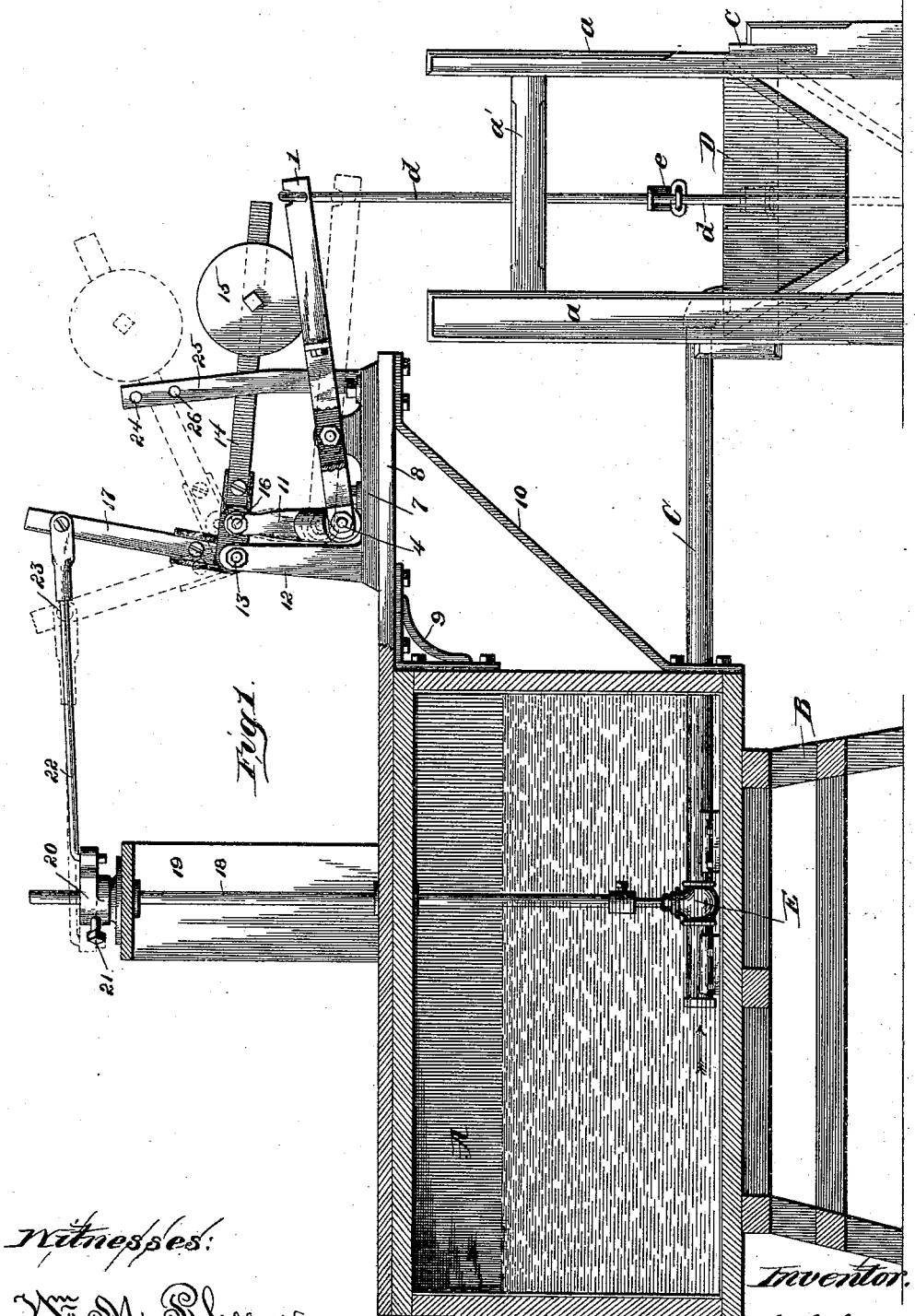

UNITED STATES PATENT OFFICE.

FREDERICK G. SCHUERMAN, OF TWIN BLUFFS, WISCONSIN, ASSIGNOR TO SCHUERMAN BROTHERS, OF SAME PLACE.

WATER-SUPPLY REGULATOR.

SPECIFICATION forming part of Letters Patent No. 478,526, dated July 5, 1892.

Application filed April 14, 1891. Serial No. 388,951. (No model.)

*To all whom it may concern:*

Be it known that I, FREDERICK G. SCHUERMAN, of Twin Bluffs, Richland county, Wisconsin, have invented certain new and useful Improvements in Water-Supply Regulators, of which the following is a specification.

This invention relates to improvements in water-supply regulators especially designed for regulating the supply of water to cattle, sheep, hogs, and other stock from tanks or other reservoirs, so as to prevent any wastage, and especially in those parts of the country where there is a scarcity of water and its use must be economized as far as is consistent with supplying the requirements of stock.

The prime object of this invention is a water-supply regulator of such a character that the amount or depth of water-supply to the watering-trough may be increased or diminished at will and automatically, while at the same time a fixed depth of water may be maintained therein at all times and however great may be the demands of the stock for water.

A further object is to have a watering-trough adjustable, to vary its height above the ground, so as to adapt it for different stock — as, for instance, cattle or sheep — whereby it may be elevated within convenient drinking distance, and I prevent either of these animals, as the case may be, from injuring it with their feet, either by pawing or stepping into it.

A still further object is to have such a trough well protected from injury and at the same time bodily removable from its protecting-frame, so that when its contents is in danger of freezing it may be removed to a distance for discharging the contents, and as a result there will be an absence of either water or ice upon the ground or floor adjacent the trough.

Another object is to have such a connection between an adjustable trough and a regulator that the trough is not only readily and easily detachable therefrom, but such a construction of regulator that as the trough is raised or lowered the flow of water into the trough may be accordingly regulated.

A still further object is not only to have the force or weight actuating the regulator adjustable, so as to compensate for or coincide with variations in the depth of water in the watering-trough, but to have between such weight and the valve governing the admission of water to the supply-pipe for the trough a connection which may be adjusted to vary the throw of the valve and correspondingly increase or diminish the supply of water to the trough.

Still further objects, hereinafter described and claimed, are embodied in the devices illustrated in the accompanying drawings, in which—

Figure 1 illustrates a side elevation of a stock-watering trough embodying my invention, with the reservoir shown in longitudinal section for the purposes of disclosing therein the position of the water-supply pipe and the connection thereof of the regulating-valve and its actuating-rod; Fig. 2, a top plan view of the same; Fig. 3, a detail horizontal section through the supply-pipe and regulating-valve therein, with the crank-arm of the valve-rod illustrated by dotted lines in the extreme of its two positions when the valve is opened and closed; Fig. 4, a vertical section through the supply-pipe and the regulating-valve thereof.

Similar letters and figures of reference indicate the same parts in the several figures of the drawings.

A indicates an ordinary tank or other reservoir for water, elevated by and supported upon a suitable frame or foundation B, and having projected therein next its bottom a pipe C, the inner end of which is opened, and its outer end projects from a water-trough D, the supply of water from the tank to said trough being regulated by a valve E, (shown in Figs. 3 and 4,) and having its position in the supply-pipe indicated by the globular shell in Fig. 1. The trough D is confined within a frame consisting of four end posts *a a* and *b b*, each pair of which are rigidly connected toward their tops by bars *a' b'*, respectively, their lower ends being thrust into the ground or socketed to a suitable foundation, as desired. At the front side of said trough is secured a board C, extending the length of the trough and of such a width and height above the ground as to protect from injury the sides of the trough by the cattle watering thereat. The trough D is suspended in this shielding-frame by means of rods D D at each end, and at the center of width of the trough the upper ends of which rods removably hook over a lever $l$, forming an element of my regulator. The trough is made adjustable, so as to vary its height above the ground and relative to the stock to be watered, forming the rods D in two parts and connecting them together by a coupling $e$, into which the two parts of the rods may be secured or adjusted from or toward each other in any desired or convenient manner, the especial form of the coupling not being an essential feature of my invention. The rods 1 1 terminate at their upper ends in hooks, as shown, to hook over the levers $l\,l$, which are notched to receive the rods and hold them in place. The levers $l\,l$ are connected together by a bar 2, or, in other words, are formed by bending a single bar to a U form, and the body or bar 2 of these levers have secured thereto by bolts or other means two parallel bars 3 3, rigidly secured at their extremities to the shaft 4, the bars 3 and 5 being clamped upon said shaft by nuts 6 or other devices suitable for that purpose. The shaft 4 is journaled in a suitable bearing in a base-plate 7, mounted upon a latch 8, projecting from the reservoir A, this latch being stiffened and braced by a corner bracket 9 and by a brace 10, secured to the reservoir near its bottom, and extending obliquely to and secured at its outer end to the latch by bolts or other suitable means; but it is proper to add that the frame-work supporting the regulator actuating devices (shown mounted upon the latch) may be supported by a structure separate from the reservoirs.

Rigidly secured to the shaft 4 and projecting perpendicularly therefrom is an arm $l\,l$, which arm, together with the frame-work of the levers $l$, practically constitutes a bell-crank lever, the pivot for which is the shaft 4. Rearwardly of the frame 11 and projecting vertically from the base-plate 8 are parallel standards 12, in which at their upper ends is journaled a short shaft 13, and rigidly secured to this shaft is a bar 14, carrying toward its free end or extremity a weight 15, and to this bar 14, at a point between the shaft 13 and the weight 15, is pivoted a crank-arm $l\,l$ by a pivot 16. Also secured to the short shaft 13 and rising perpendicularly above the same is a lever 17, which, together with the bar 14 and the crank-arm formed by the arms $l\,l$ and the frame of the levers $l$, constitute a combined lever actuated in the one direction by the weight 15 and in the other by the trough and its contents—that is to say, when the combined weight of the trough and its contents reaches a certain weight the lever-arms $l$ are depressed and the weight 15 elevated, but when the weight of the trough and its contents is diminished below the predetermined point then the weight 15 depresses the arm 14, thereby elevating the lever $l$ and with it the trough; but in practice there is but little movement on the part of the trough for the reason that the weight of the trough is counterbalanced by the weight 15 and the several parts maintained substantially in equilibrium. The bars 14 and 17, being rigidly secured, as they are, to one and the same shaft 13, also form a bell-crank lever, so that in effect the combined lever is formed of two bell-cranks, the short arm of one being pivoted to the long arm of the other bell-crank at a point removed from its pivot, the power of the long arm of one being derived from a weight 15, which slides on its bar and is secured thereto by a screw to provide for a variable power, and the power for the long arm of the other bell-crank being derived from the trough and its contents and also variable owing to the increasing and diminishing weight of the trough as water is supplied to and exhausted therefrom. Constructed in this manner these governing devices and the connection with the trough also provide for automatically controlling the seating and unseating of the valve E by means of certain connections now to be described. The valve E is provided with a valve-rod 18, which projects up through and is journaled in a bracket 19, mounted on the reservoir A, and to this valve-rod 18 is secured a crank-arm 20 by means of a screw 21. Now to actuate the valve-rod this crank-arm 20 is connected with the bell-crank arm 17 by a rod 22, the adjustment of the connecting-rod 22 being provided for by screwing it into a casting 23, which is a part of the rod and which is pivoted to the lever 17, the connection of the rod 22 with the crank-arm 20 being secured by a bend in the connecting-rod 22, projecting through a perforation in the crank-arm 20, as clearly shown in Fig. 1. The valve E is an ordinary spigot or cock in form—that is to say, as shown in Figs. 3 and 4, is a perforated plug, the perforation of which when registering with the bore of the supply-pipe forms a continuation thereof, but which when the spigot is turned on a vertical axis closes the passage in the supply-pipe. When this valve is open and water is passing from the reservoir into the trough, the several parts of the regulator are in the position shown in full lines in Fig. 1; but when the trough has received the full predetermined depth of supply of water the several parts are then in the position indicated by dotted lines in Fig. 1, these full lines and dotted lines indicating the extremities of the movement of the regulator and the trough and the dotted lines in Fig. 3 the same position of the bell-crank 20.

To more specifically describe the operation of my regulator, we will assume the parts to be in full lines (shown in Fig. 1) and the bell-crank 20 in its left-hand position in Fig. 3, with the trough emptied. In these positions the valve E is open and the water is flowing from the reservoir A through the supply-pipe C to the trough. Now as soon as the desired depth of water (which also represents its weight) is in the trough the weight of this water, combined with the trough, will overcome the weight 15, depressing the lever *l*, elevating the weight 15, swinging the lever 17 toward the crank-arm 20 and the crank-arm to the other extremity of its position, all as indicated by the dotted lines before referred to, and as a result the valve E will be turned upon its vertical axis and shut off a further supply of water to the trough until exhausted therefrom to or below this fixed depth, when the weight 15 will again overcome that of the trough and its contents and the several parts descend to their positions. (Shown in full lines in Fig. 1 and by the dotted at the right hand of Fig. 3.) The adjustment of the weight 15 toward or from the end of the bar 14 results in increasing and diminishing the depth of water in the trough—as, for example, as the weight is shifted toward the free end of the bell-crank arm 14, more water must accumulate in the trough to break the weight than if it is further removed toward the pivot of the bar 14.

The stroke of the valve may be and is regulated by shortening or lengthening the arm 22 through screwing or unscrewing it into the casting connecting it with the lever 17. The downstroke of the weighted arm 14 is limited by the length of the connecting-rod 22 and the upstroke of the weighted arm 14 by a pin 24 in a standard 25, rising from the base 7, and the weighted arm may be locked at its upper stroke by means of a removable pin 26 in said arm 25, whereby no discharge of water into the trough can take place until said pin 26 is removed, this absence of discharge being frequently desirable over night in cold weather and when no supply of water in the trough is necessary. When the arm 22 is at full length and the valve making its greatest possible stroke, the weighted bar is also making its full stroke; but if we shorten the rod 22 the stroke of the weighted bar 14 is correspondingly shortened, and therefore as we shorten the stroke of the valve we quicken its action in seating and unseating; but, as before stated, when the weight is at the end of its lever the valve remains open longer and the depth of water becomes greater in the trough than when the weight is moved toward the pivot of its bar.

The discharge of water into the trough is increased or diminished as the stroke of the valve is increased or diminished, and by this means of adjustment I am enabled to supply the trough with a desired amount of water in a given time, and to increase or diminish the depth therein, as may be required, to adapt it both for small and large animals— as, for instance, cattle and sheep or hogs— and to have such a nicety of adjustment that there is the greatest possible economy of water and no liability of wastage, and by means which are readily and quickly adjustable and not liable to get out of order or require any special skill or tools for manipulating them to make this adjustment.

The adjustability of the height of the trough enables it to be varied to adapt it to these different animals, the frame to protect it against injury by both, and its removability for promoting its removal when for any reason it is desirable to empty it of its contents, and especially at a distance from the apparatus.

In conclusion, it is proper to observe that my invention is not limited to a pair of yoke-like arms for suspending the trough, for obviously, it would be no departure from my invention to provide the trough with a bail or other analogous device, and employ but a single arm to connect the trough with and actuate it by the regulator.

Having described my invention, what I claim, and desire to secure by Letters Patent, is—

1. The combination, in a water-supply regulator, of two bell-crank levers, separate pivots therefor, a pivot between an arm of one of said levers with the arm of the other lever, a trough suspended from one of said bell-cranks, a weight upon one arm of the other bell-crank, a valve, a valve-stem, a crank-arm upon said valve-stem, and a rod connecting said bell-crank with the remaining arm of the bell-crank lever, substantially as described.

2. In a water-supply regulator, the combination of two bell-crank levers pivoted together upon different axes, a trough suspended from one of said levers, an adjustable weight upon the arm of the other lever, a valve, and an adjustable connection between an arm of said latter lever and valve, substantially as described.

3. In a water-supply-regulating device, the trough D, the suspending-arms therefor, and the guard-frame therefor, comprising the posts A, bar *a'*, and board C at the front thereof opposing the trough, substantially as described.

4. The combination, in a water-supply regulator, of two bell-crank levers, each having a short and a long arm, a standard in which one of said levers is pivoted, an adjustable weight on the long arm of said pivoted lever, and said long arm being pivoted to the short arm of the other lever between said weight and standard, a stock-watering trough suspended from the long arm of said other lever, and a valve connected to the short arm of the weighted lever, both of said long arms being arranged on the side next to the trough, substantially as set forth.

FREDERICK G. SCHUERMAN.

Witnesses:
J. T. WOOD,
E. E. McCOLLUM.